: US006038117A

United States Patent [19]
Dullni et al.

[11] Patent Number: 6,038,117
[45] Date of Patent: Mar. 14, 2000

[54] POWER SWITCHING APPARATUS

[75] Inventors: Edgar Dullni, Ratingen, France; Joachim Glatz Reichenbach, Baden-Dättwil, Switzerland; Jan Kuhlefelt, Skien, Norway; Ruzica Loitzl, Kirchdorf, Switzerland; Zdenek Pelanek, Brno, Czechoslovakia; Jørgen Skindhøj, Baden; Ralph Strümpler, Gebenstrof, both of Switzerland

[73] Assignee: ABB Research Ltd., Zurich, Switzerland

[21] Appl. No.: 09/001,807

[22] Filed: Dec. 31, 1997

[30] Foreign Application Priority Data

Jan. 22, 1997 [DE] Germany ............................ 197 02 094

[51] Int. Cl.[7] .................................................. H02H 3/093
[52] U.S. Cl. ................................ 361/58; 361/127; 361/65
[58] Field of Search ................................. 361/23, 58, 62, 361/63, 65, 67, 76, 119, 125, 127

[56] References Cited

U.S. PATENT DOCUMENTS

| 5,296,996 | 3/1994 | Hansson et al. ........................ 361/24 |
| 5,530,613 | 6/1996 | Bauer et al. ............................ 361/58 |
| 5,886,860 | 3/1999 | Chen et al. ............................. 361/9 |

FOREIGN PATENT DOCUMENTS

| 0548606B1 | 6/1993 | European Pat. Off. . |
| 0655760A2 | 5/1995 | European Pat. Off. . |
| 92 11 808 U | 11/1992 | Germany . |
| 19534273A1 | 3/1997 | Germany . |
| WO90/00825 | 1/1990 | WIPO . |

OTHER PUBLICATIONS

"Technische Anwendung von Kaltleitern", Von H. Glenk, STEMAG—Machrichten 37, Dec. 1963, pp. 1012–1017.

Primary Examiner—Jeffrey Gaffin
Assistant Examiner—Kim Huynh
Attorney, Agent, or Firm—Burns, Doane, Swecker & Mathis, L.L.P.

[57] ABSTRACT

A power switching apparatus is disclosed which has an electrical conductor to which high voltage can be applied. A series of circuits formed by a switching point and a current-limiting element which contains PTC thermistors and varistors is arranged in the cable run of the electrical conductor. An apparatus for operating the switching point interacts with the current-limiting element. The current-limiting element has n (where n is a natural number greater than 1) series-connected parallel circuits each having at least one PTC thermistor and at least one varistor connected in parallel with it. A current sensor arranged in the cable run of the electrical conductor or those connections of one of the PTC thermistors and of the varistor connected in parallel with it which are interconnected at two junction points in one of the parallel circuits are operatively connected to the input of the operating apparatus. Such a power switching apparatus is designed using economic components, such as PTC thermistors and varistors for low-voltage applications, and a switching device which is designed for switching only low currents and can effectively limit large and small short-circuit currents without the current-limiting element connected upstream of the switching device, and/or the switching device, being overloaded.

11 Claims, 6 Drawing Sheets

POWER SWITCHING APPARATUS

BACKGROUND OF THE INVENTION

1. Field of the Invention

The invention is based on a power switching apparatus. Such a power switching apparatus is used in systems which are operated with voltages above 1 kV. The power switching apparatus is used to protect equipment in the system against both slowly rising currents (overcurrents) and quickly rising currents (short-circuit currents).

2. Discussion of Background

A power switching apparatus of the type mentioned above is described in EP 0 655 760 A. In this power switching apparatus, a switching device and a PTC thermistor are arranged, connected in series with one another, in an electrical conductor carrying a high voltage. Above a threshold value, the PTC thermistor limits the current carried in the electrical conductor. A varistor connected in parallel with the PTC thermistor prevents undesirable voltage spikes occurring at the onset of current limiting, which could load the PTC thermistor to an unacceptably high level. Changes in the physical characteristics of the PTC thermistor which indicate that the current is being limited, such as geometric dimensions, temperature or electrical resistance, are detected as a signal. The detected signal is supplied to a tripping apparatus, which opens the switching device.

A switching apparatus having a plurality of series-connected PTC thermistors is specified in WO 90/00825 A1. In this apparatus, 10 of 30 PTC thermistors are in each case connected in series, and the three resultant series circuits are connected in parallel with one another. This switching apparatus allowed an alternaing current of only 2 A to be limited at a voltage of 6 kV. A series resistance of about 500 Ω was required for this purpose.

A resistor having a PTC characteristic and which is distinguished by a high rated-current capacity and a high withstand voltage is already known from EP 0 548 606 B1. This resistor has a plurality of series-connected PTC thermistors. A varistor, which dissipates locally occurring overvoltages, is connected in parallel with each of the PTC thermistors. The PTC thermistor and the varistor have a common contact surface. This results in the temperature distribution in the thermistor being homogenized, thus effectively countering the risk of local overheating. At the same time, this increases the rated-current capacity.

SUMMARY OF THE INVENTION

Accordingly, one object of the invention, is to specify, a power switching apparatus of the type mentioned initially which is designed in a simple and economic manner and is distinguished by a high level of operational safety and reliability.

The power switching apparatus according to the invention is designed from economic components, such as PTC thermistors and varistors for low-voltage applications and a switching device which is designed to switch only low currents, and can switch off large and small currents without the current-limiting element connected upstream of the switching device, and/or the switching device, being overloaded. The voltage distribution across the current-limiting element is homogenized as a result of the fact that the current-limiting element is split into a plurality of PTC thermistors, each of which has a shunt varistor. Should any of the PTC thermistors carry out a PTC transition before the other PTC thermistors and increase its resistance suddenly, then the full mains voltage which is now present across this resistor cannot act, since this voltage also acts on the parallel-connected varistor and is limited by this varistor within microseconds. This reliably avoids any damaging overloading of one of the PTC thermistors, and thus destruction of the current-limiting element. As a result of the homogenization of the voltage distribution across the current-limiting element, the PTC thermistors can accommodate the returning voltage for 100 ms, without being overloaded in the process, once the short-circuit current has been limited within a few milliseconds, for example 5 ms. In this time period, the severe short-circuit current of, typically, 3 to 14 kA is limited to less than 1 kA, even a low-rating switch, for example a load-break switch such as a switch-disconnector, in particular, can then be used for safe opening of the power switching apparatus.

It is particularly advantageous in this case that a voltage signal, which is formed by the sudden increase in resistance across one of the PTC thermistors when the PTC transition takes place, can be passed directly to an operating apparatus for the switching device. There is then no need for a sensor, such as a current transformer or additional means which detect a physical change in the state of the PTC thermistor.

The power switching apparatus according to the invention allows even small overcurrents to be detected and limited with great accuracy. This can be achieved in a particularly advantageous manner by one of the PTC thermistors having a greater resistance than any of the other PTC thermistors. This lower resistance is expediently achieved by reduced cooling or by a reduced cross section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
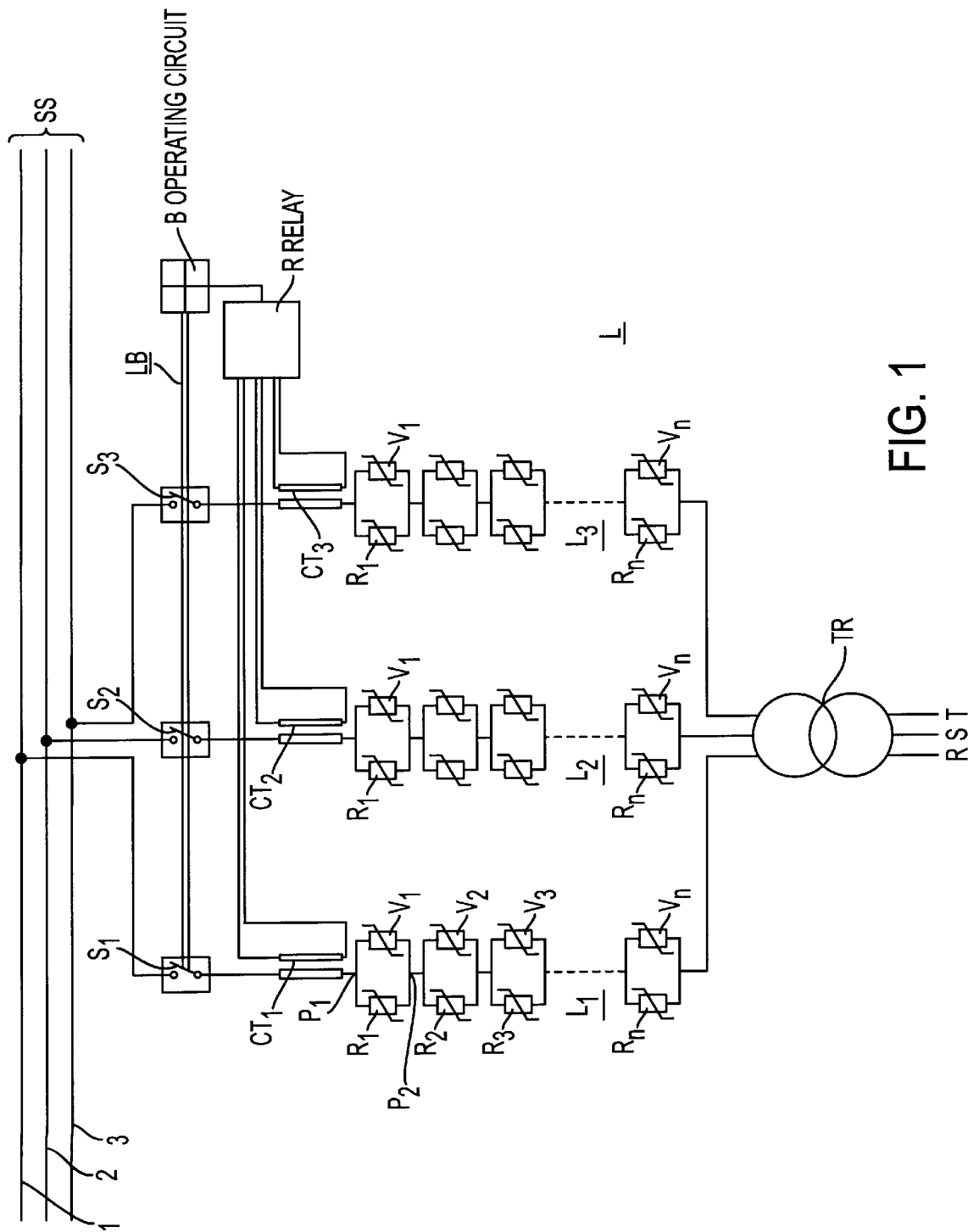
FIGS. 1 to 3 each show a medium-voltage power supply, in each of which one of three embodiments of the power switching apparatus according to the invention is used.
Figure 2:
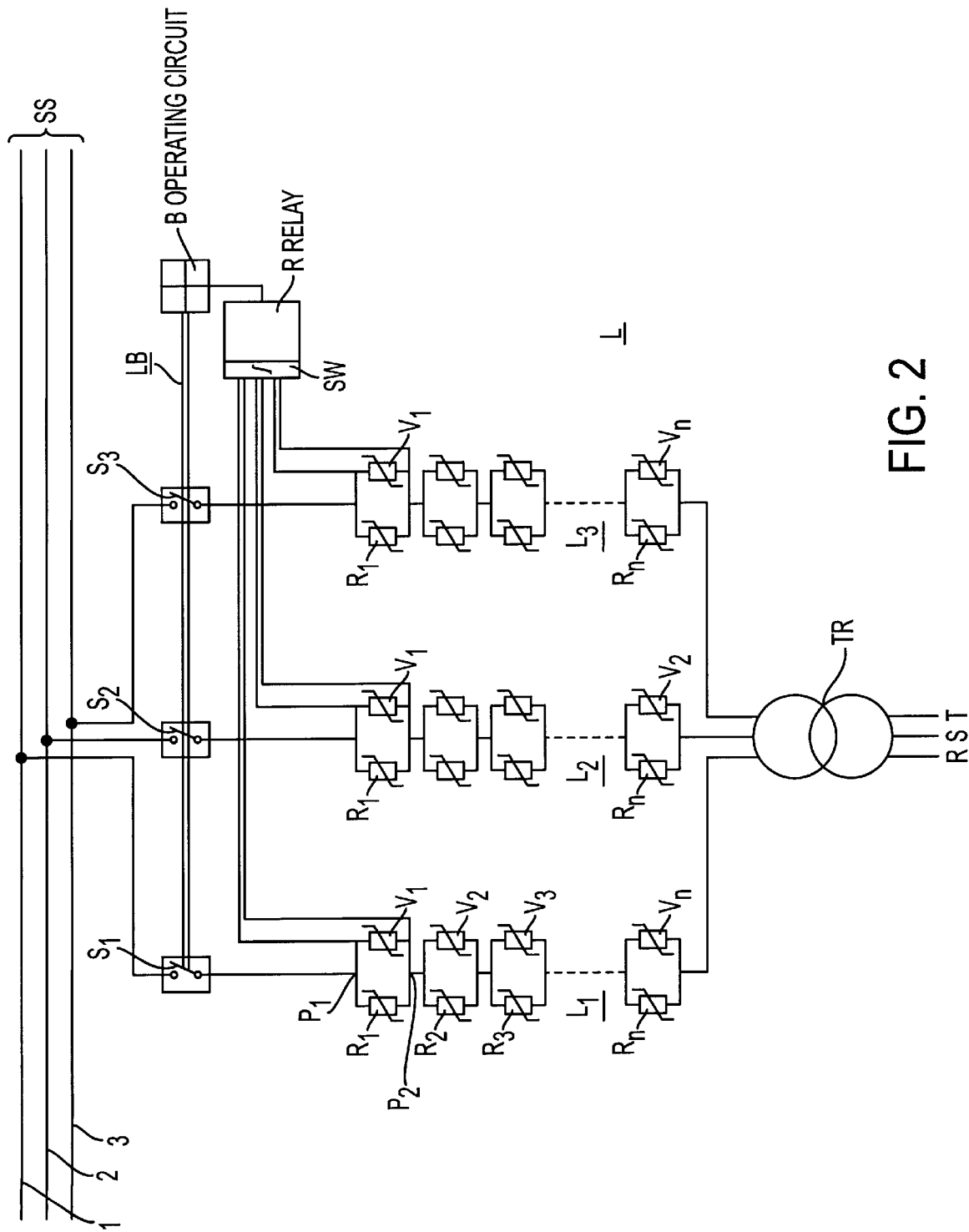
Figure 3:
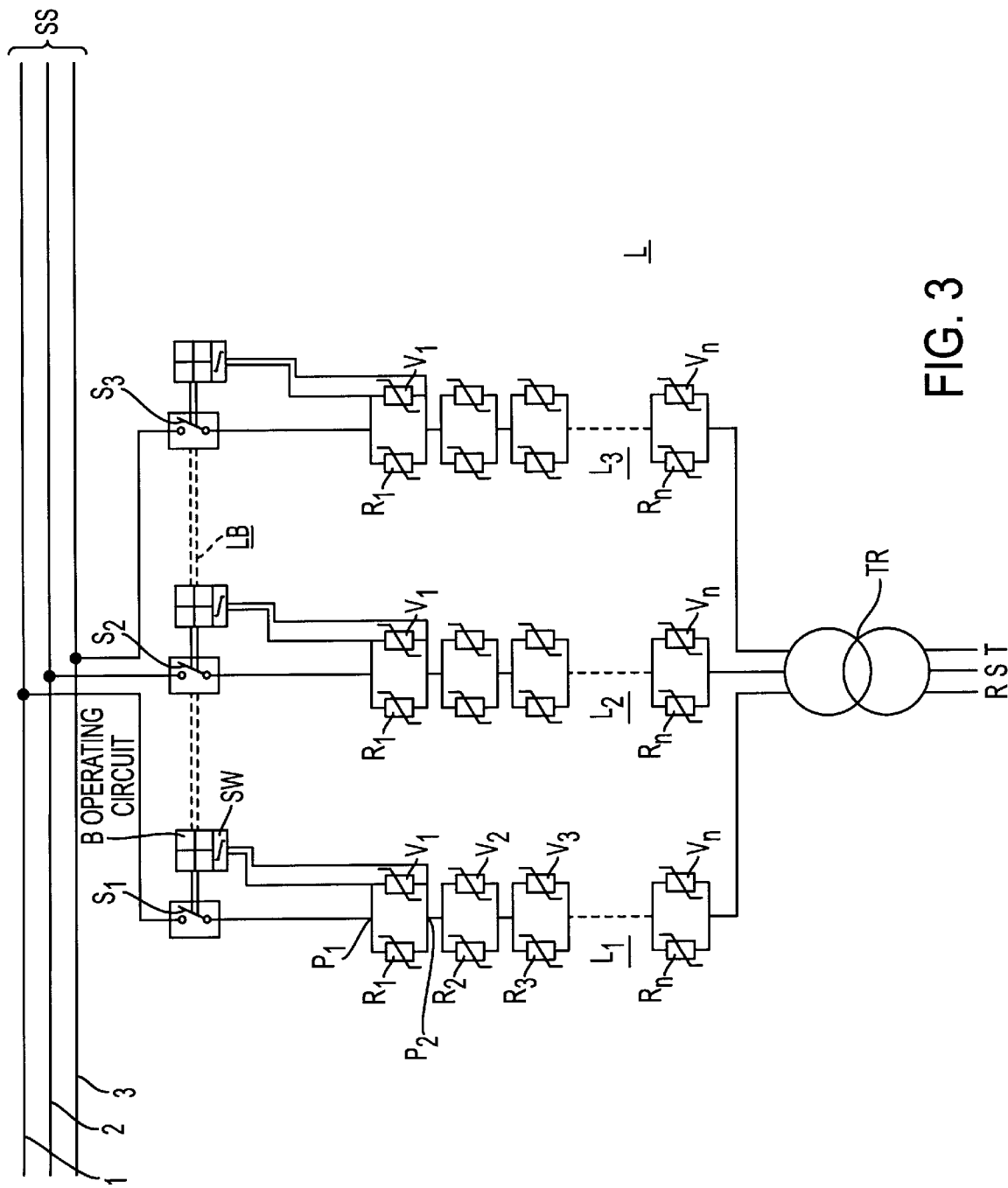

Referring now to the drawings, like reference numerals designate identical or corresponding parts throughout the several views. In the 50 Hz medium-voltage power supplies illustrated in FIGS. 1 to 3, SS represents a three-phase busbar whose three phase conductors 1, 2, 3 have a voltage of, for example, 12 kV between them. The phase conductors are connected via a power switching apparatus L to the primary of a transformer TR whose secondary supplies a low-voltage power supply. The power switching apparatus L essentially has one electrical conductor per phase, which is connected to the associated phase conductor, for example 1, of the busbar SS and of the transformer and in whose cable run a series circuit is arranged, formed by one of three identical switching points $S_1$, $S_2$ or $S_3$ of a switching device LB, and by one of three identical current-limiting elements $L_1$, $L_2$, $L_3$. In the embodiment of the power switching device illustrated in FIG. 1, the electrical conductors act as the primary conductors for inductive current transformers $CT_1$, $CT_2$ and $CT_3$. If required, the electrical conductors can also interact with other current sensors.

Each current-limiting element $L_1$, $L_2$, $L_3$ contains n (where n is a natural number greater than 1) predominantly identical PTC thermistors $R_1$, $R_2$, $R_3$, ..., $R_n$ connected in series with one another. One of n identical varistors $V_1$, $V_2$, $V_3$, ..., $V_n$ is connected in parallel with each PTC thermistor.

The switching device has an operating apparatus B which acts on the switching points $S_1$, $S_2$ and $S_3$ and has one input which is operatively connected to an output of the current transformer, for example $CT_1$ (FIG. 1), or to those connections of one of the PTC thermistors, for example $R_1$, and the associated varistor, for example $V_1$ (FIGS. 2 and 3) which are interconnected at junction points $P_1$ and $P_2$ in one of the parallel circuits. In the embodiments according to FIGS. 1 and 2, a relay R is arranged between the current transformer, for example $CT_1$, and the operating apparatus B, as well as between the junction points $P_1$, $P_2$ and the operating apparatus B while, in the embodiment according to FIG. 3, the two junction points $P_1$ and $P_2$ are connected directly to the input of in each case one of three operating apparatuses B, one of which is provided for each phase. The relay R (FIG. 2) or each of the operating apparatuses B (FIG. 3) contains a threshold detector SW which is controlled by the voltage dropped across the associated PTC thermistor $R_1$. The threshold detector has an associated response value which, when a PTC transition takes place and before any possible breakdown of the varistor $V_1$, is below a voltage-proportional signal passed from the parallel circuit to the relay or the operating apparatus.

The PTC thermistor $R_1$ which acts on the input of the operating apparatus B has a slightly greater resistance, for example 20%, than the other PTC thermistors $R_2$, $R_3$, ..., $R_n$. This can be achieved in a particularly simple manner by this PTC thermistor having a cross section which is smaller than that of the other PTC thermistors, or being cooled to a lesser extent than these thermistors.

The resistor bodies of the PTC thermistors $R_1$, $R_2$, ..., $R_n$ were formed by mixing about 50 per cent by volume of polyethylene with about 50 per cent by volume of $TiB_2$ in the form of powder with particle sizes of between about 10 and about 30 $\mu$m, pressing the resultant mixture at a raised temperature to form initial material in the form of plates, and cutting strips out of the initial material. Pressed electrodes were fitted to each of the two ends of the strips. This resulted in PTC thermistors having a distance of about 5 mm between the two pressed electrodes and having a cross section of about 0.5 cm². In general, a hot zone which governs the PTC transition and occurs in the resistor body of the PTC thermistor has a length of about 2 mm. To avoid adversely influencing the formation of the hot zone, the distance between the electrical connections (which are designed as pressed electrodes) of the PTC thermistors should thus in each case be at least 3 mm, preferably 4–6 mm.

The varistors $V_1$, $V_2$, ..., $V_n$ were based on metal oxide and had uninterrupted operational voltages (for alternating current) of about 100–300 V, preferably at least 140 V. In the conductive state, the varistor voltages were less than the voltages which were just about held by the PTC thermistors. The overvoltages were typically 300 to 500 V, preferably at least 340 V. Instead of a varistor having an uninterrupted operational voltage of, for example, 200 V, two series-connected varistors can also be used, each having an uninterrupted operational voltage of, for example, 100 V. Since the varistors must consume energy, varistor diameters of between 40 and 100 mm were typical.

10 PTC thermistors were in each case stacked one on top of the other. In a first exemplary embodiment, six series-connected stacks were used. A varistor was connected in parallel with each of the 60 PTC thermistors. The resistance of the current-limiting element formed in this way, for example $L_1$, was about 3.25 $\Omega$ before use of the power switching apparatus L.

Figure 4:
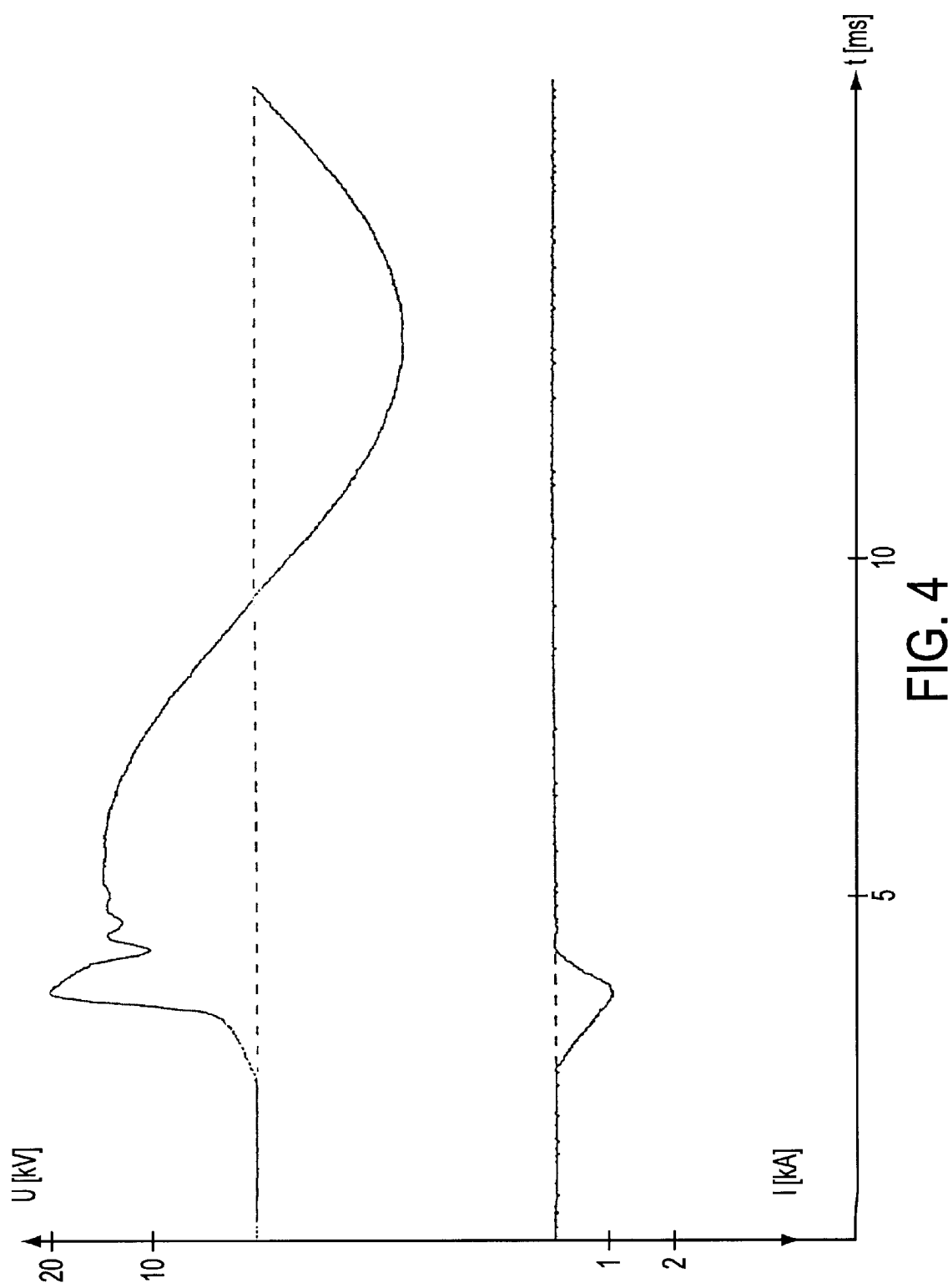
FIG. 4 shows a diagram in which a current I [kA] which is carried by the power switching apparatus according to FIG. 1 with in each case 60 PTC thermistors and varistors as a result of a prospective short-circuit current of 6.5 [kA] acting in a 12 kV power supply, as well as the voltage U [kV] acting on the power switching apparatus in this case are illustrated as a function of time t [ms]

The diagram in FIG. 4 and the following table show the time profile of the intensity of a current I, which is carried as a result of a prospective short-circuit current with a root mean square value of 6.5 kA in the power switching apparatus, and the voltage U dropped across the power switching apparatus in this case. The power switching apparatus was subjected, in a medium voltage power system, to a recurring voltage having a peak value of about 15 kV and a root mean square value of about 10.5 kV.

|  | 1st disconnection | 2nd disconnection | 3rd disconnection |
|---|---|---|---|
| Maximum current $I_{max}$ [kA] in the power switching apparatus | 1.13 | 0.62 | 0.51 |
| Time duration t [ms] from the onset of the current I in the power switching apparatus until the current maximum $I_{max}$ is reached | 1.49 | 1.17 | 1.02 |
| Resistance R [$\Omega$] of the power switching apparatus after disconnection | 7.3 | 8.1 | 10.8 |
| maximum voltage $U_{max}$ [kV] acting in the power switching apparatus | 20.5 | 16.7 | 15.8 |
| recurring voltage in the medium voltage supply System $U_{rec}$ [V] | 10.5 | 10.6 | 10.5 |

-continued

|  | 1st disconnection | 2nd disconnection | 3rd disconnection |
|---|---|---|---|
| time period t [ms] in which the PTC thermistors are subjected to the full mains voltage before the switching point opens | 100 | 100 | 100 |

As can be seen from the diagram in FIG. 4 and the table, the current reaches its maximum value of about 1.13 kA after about 1.5 ms, and was then limited virtually to a value of zero in about 1 ms. As can be seen from the table, the current-limiting element held the applied voltage for about 100 ms, before this voltage dropped to the level of the recurring voltage after about 5 ms. The switching device LB which interrupts the remaining residual current may thus have a slow drive, designed with a relatively low rating. As can be seen from the table, it was possible to disconnect the prospective short-circuit current a number of times without any problems. In the process, the value of the total resistance R of the power switching apparatus, which was more than doubled after the first disconnection and is governed essentially by the PTC thermistors, no longer is increased particularly severely.

The maximum voltages $U_{max1}$ and $U_{max2}$ and $U_{max3}$, respectively, dropped across the series circuits formed by the PTC thermistors $R_1$ to $R_{10}$ and $R_1$ to $R_{20}$ and $R_1$ to $R_{30}$, respectively, as well as the recurring voltages $U_{rec1}$ and $U_{rec2}$ and $U_{rec3}$, respectively, were measured at the same time during the three disconnection processes described above. This resulted in the values shown in the following table:

|  | 1st disconnection | 2nd disconnection | 3rd disconnection |
|---|---|---|---|
| $U_{max1}$ [kV] | 3.7 | 3.0 | 2.9 |
| $U_{max2}$ [kV] | 6.8 | 5.8 | 5.3 |
| $U_{max3}$ [kV] | 10.3 | 8.3 | 7.6 |
| $U_{max}$ [kV] | 20.5 | 16.7 | 15.8 |
| $U_{rec1}$ [kV] | 1.7 | 2.0 | 2.0 |
| $U_{rec2}$ [kV] | 3.3 | 3.7 | 3.6 |
| $U_{rec3}$ [kV] | 5.4 | 5.5 | 5.4 |
| $U_{rec}$ [kV] | 10.5 | 10.6 | 10.5 |

It can be seen that the voltage distribution is very homogeneous across all the PTC thermistors. On average, the maximum voltage dropped across each of the PTC thermistors is only about 340 V. It can also be seen that the PTC thermistors all respond at the same time. The signal emitted by one of the PTC thermistors, that is to say, in particular, from the PTC thermistor $R_1$ as well, can thus be used to control the operating apparatus B.

Figure 5:
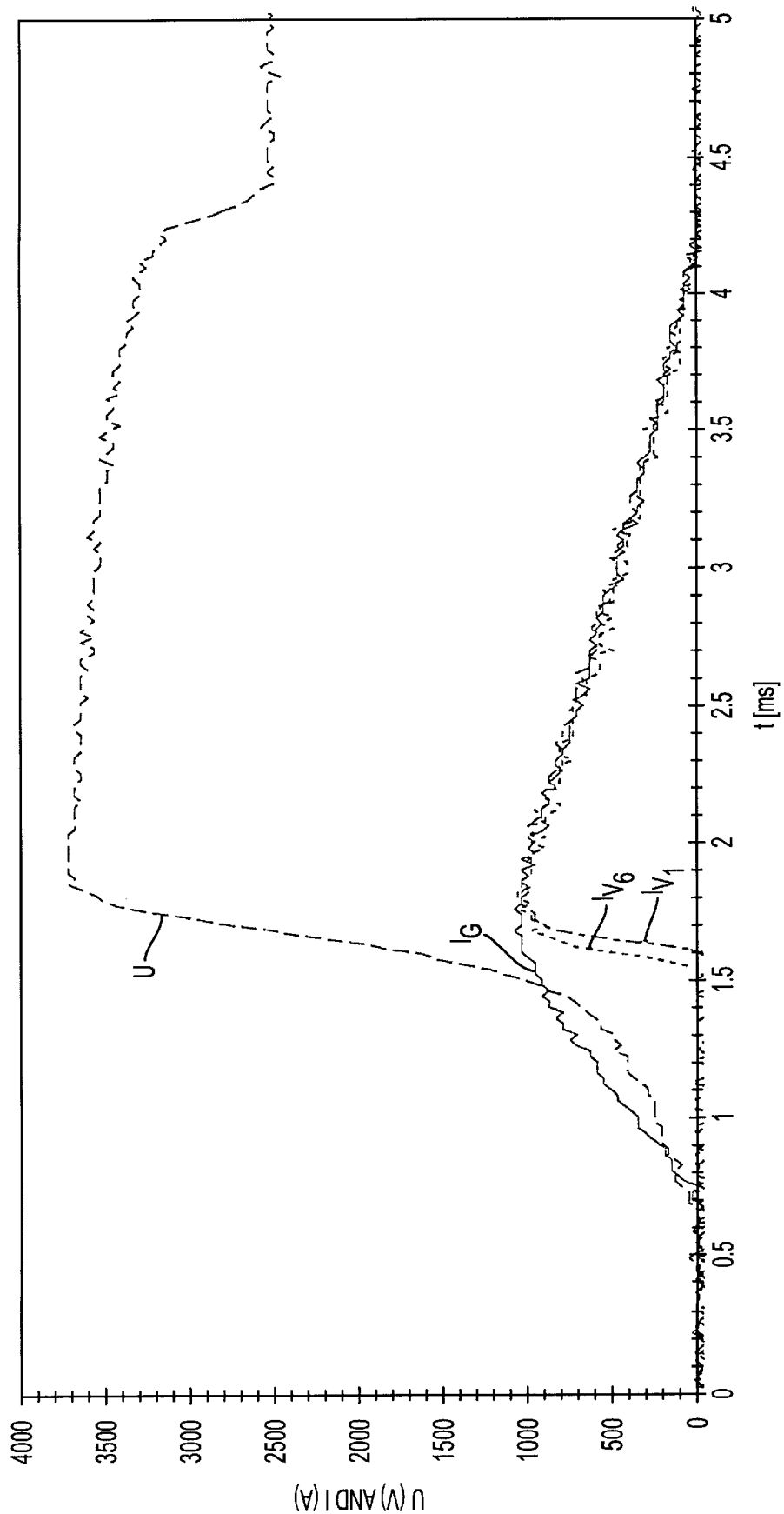
FIG. 5 shows a diagram in which currents $I_1$ [A] and $I_6$ [A] which are carried by the power switching apparatus according to FIG. 1 with in each case 10 PTC thermistors and varistors as a result of a prospective short-circuit current of 3.7 [kA] in two of the varistors, the total current $I_G$ [A] carried by the power switching apparatus and the voltage U [V] acting on the power switching apparatus in this case are illustrated as a function of time t [ms]
Figure 6:
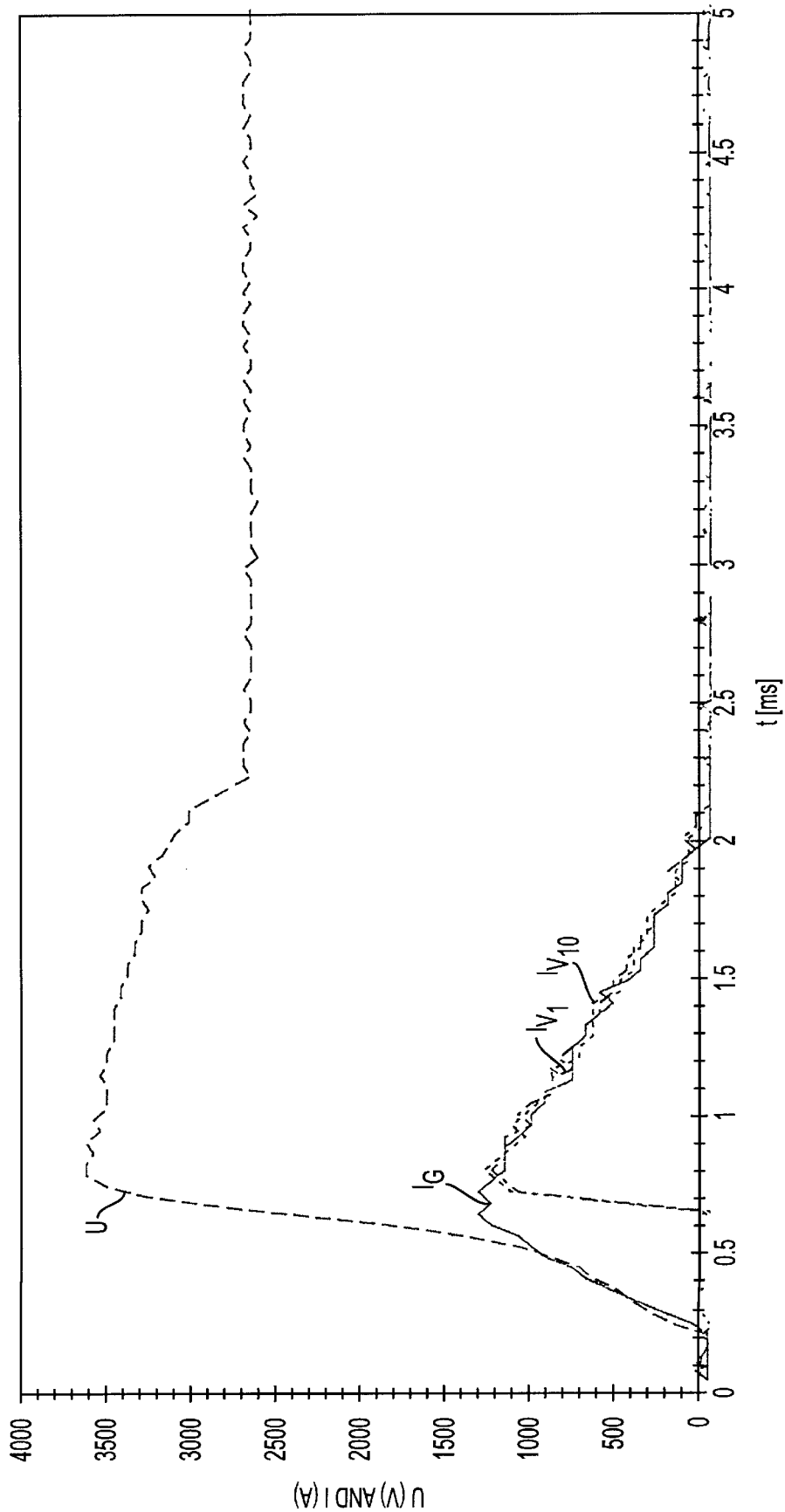
FIG. 6 shows a diagram in which currents $I_1$ [A] and $I_{10}$ [A] which are carried by the power switching apparatus according to FIG. 1 with in each case 10 PTC thermistors and varistors as a result of a prospective short-circuit current of 13.5 [kA] in two of the varistors, the total current $I_G$ [A] carried by the power switching apparatus and the voltage U [V] acting on the power switching apparatus in this case are illustrated as a function of time t [ms].

In a second exemplary embodiment of the invention, 10 PTC thermistors of the type mentioned above were in each case connected in series as the current-limiting element, for example $L_1$, and a varistor of the type mentioned above was connected in parallel with each of the PTC thermistors. Using a power switching apparatus according to the invention and provided with such a current-limiting element, it was possible to limit successfully large and small short-circuit currents. In this case, the power switching apparatus was arranged in a DC test circuit with a capacitor bank that was charged to 3,000 V and was connected in the circuit for one test sequence. Depending on the size of the capacitor bank, prospective short-circuit currents were fed into the test circuit on connection which, after conversion, corresponded to 50 Hz root mean square currents of 3.7 kA (FIG. 5) and 13.5 kA (FIG. 6). In this case, this resulted in the profiles for the voltage U across the power switching apparatus and for the current I carried by the power switching apparatus as shown in FIGS. 5 and 6 as a function of time. The currents $I_{V1}$ and $I_{V6}$, as well as $I_{V1}$ and $I_{V10}$, respectively, carried by the varistors $V_1$ and $V_6$ as well as $V_1$ and $V_{10}$, respectively, were also determined at the same time.

These diagrams show that relatively small short-circuit currents (FIG. 5) are limited to a value of virtually zero after about 4 ms, while, in the case of relatively large short-circuit currents (FIG. 6), this limiting is complete after just 2 ms, because of the greater maximum current carried in the power switching apparatus. At the same time, these diagrams show that a major proportion of the current $I_G$ carried in total by the power switching apparatus flows through the varistors. The varistors therefore have to have an energy consumption capacity comparable to that of the PTC thermistors.

Since both small and large short-circuit currents are limited to residual currents in the ampere range after a few milliseconds, the short-circuit current can be disconnected within a short time, for example one half-cycle, by means of a quick-action switching device LB that is intended for switching only small currents. In general, there is no need for such a quick-action switching device. During the tests mentioned above, it was found that, after limiting of the current I, the voltage U could be held without any problems for 200 ms (prospective short-circuit current of 3.7 kA; FIG. 5) or for 800 ms (prospective short-circuit current of 13.5 kA; FIG. 6). The switching device LB may therefore be a switch which is not only intended for switching only small currents but also has a very low-rating drive which takes more than 0.5 s to reach its disconnected position.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A power switching apparatus comprising:
   at least one electrical conductor to which high voltage can be applied;
   a series circuit arranged in a cable run of the electrical conductor and formed by a switching point and a current-limiting element;
   an operating apparatus which interacts with the current limiting element in order to operate the switching point, wherein the current-limiting element has n-series connected parallel circuits each having at least one PTC thermistor and at least one varistor connected in parallel with each PTC thermistor, n being a natural number greater than 1; and
   connections of one of the n-series connected parallel circuits at two junction points being operatively connected to the input of the operating apparatus, wherein the PTC thermistor of said one n-series connected parallel circuit which acts on the input of the operating apparatus has a greater resistance than remaining PTC thermistors of the current limiting element.

2. The power switching apparatus as claimed in claim 1, wherein the switching point is part of a switching device designed as a load-break switch.

3. The power switching apparatus as claimed in claim 2, wherein the load-break switch is a switch-disconnector.

4. The power switching apparatus as claimed in claim 1, wherein a relay is arranged between the two junction points and the input of the operating apparatus.

5. The power switching apparatus as claimed in claim 1, wherein the two junction points are connected to the input of the operating apparatus.

6. The power switching apparatus as claimed in claim 4, wherein the relay of the operating apparatus has a threshold detector which is controlled by voltage present at the two junction points when a PTC transition takes place.

7. The power switching apparatus as claimed in claim 1, wherein an uninterrupted operating voltage of the varistors is in each case at least 100 V, and an overvoltage in a switching state is in each case at least 300 V.

8. The power switching apparatus as claimed in claim 7, wherein an uninterrupted operating voltage of the varistors is in each case at least 140 V, and an overvoltage in a switching state is in each case at least 340 V.

9. The power switching apparatus as claimed in claim 1, wherein a distance between electrical connections of the PTC thermistors is in each case at least 3 mm.

10. The power switching apparatus as claimed in claim 9, wherein a distance between electrical connections of the PTC thermistors is in each case at least 4 to 6 mm.

11. The power switching apparatus as claimed in claim 1, wherein the PTC thermistor which has the greater resistance is cooled to a reduced extent or has a smaller cross section than the remaining PTC thermistors.

* * * * *